Oct. 6, 1925.
W. KÖLER, JR
1,555,923
DRILLING OR FISHING JAR AND METHOD OF MANUFACTURING THE SAME
Filed Feb. 17, 1921
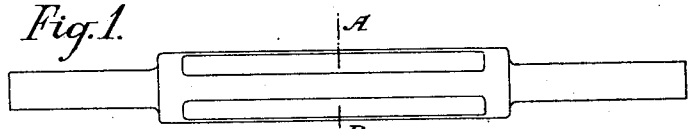
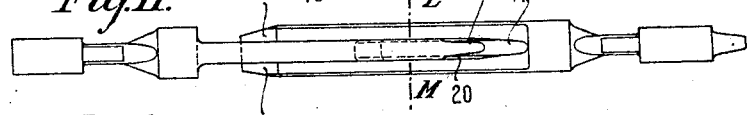
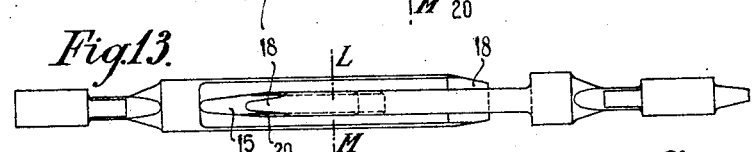
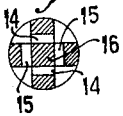
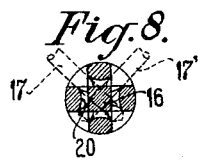
Inventor
W. Köler, Jr.
By Marks & Clerk
Attys.

Patented Oct. 6, 1925.

1,555,923

UNITED STATES PATENT OFFICE.

WILLEM KÖLER, JR., OF HAARLEM, NETHERLANDS, ASSIGNOR, BY MESNE ASSIGNMENTS, TO SPANG AND COMPANY, OF BUTLER, PENNSYLVANIA, A CORPORATION OF PENNSYLVANIA.

DRILLING OR FISHING JAR AND METHOD OF MANUFACTURING THE SAME.

Application filed February 17, 1921. Serial No. 445,794.

*To all whom it may concern:*

Be it known that I, WILLEM KÖLER, Jr., a subject of the Queen of Holland, residing at Haarlem, Netherlands, have invented certain new and useful Improvements in Drilling or Fishing Jars and Methods of Manufacturing the Same, of which the following is a specification.

A jar is a tool which is interposed in a percussive drilling rod for performing deep boring operations for obtaining a certain axial freedom of movement of the drilling bit and its sinker bar relatively to the drilling rod. It consists primarily of two interengaging links or loops each provided with a screw-thread for attachment to the boring tool with a minimum transverse play and movable in axial direction relatively to one another within certain limits.

Heretofore in the production of this tool it was necessary to close at least one of the two links by welding the material. Weldable material (iron or steel) is, however, necessarily soft; in consequence the jar wears comparatively quickly at the links, and the limbs of the links being too soft are liable to extend so that the stroke of the jar is too great and the tool therefore becomes useless and unreliable.

According to the present invention a jar may be made in a single piece, while there may be used material the composition of which is such that there is a minimum wear and extension of the links, provided however, that the material be malleable.

The jar produced according to the invention is made in a single piece without any weld and is machined at a large number of places to the centre of the original bar. Owing to this method, the central portion of the bar may be examined for possible faults in the material, thus ensuring that the tool will be absolutely reliable. This weldless method of production can be readily verified metallographically.

The new method is hereinafter described with reference to the accompanying drawing.

Figure 1 is a side view of the bar from which the improved jar is made.

Figure 2 is a section taken on line A—B of Fig. 1.

Figure 3 is a side view of the bar after it has been provided with slots to form links having oppositely directed pointed members.

Figure 4 is a section taken on line C—D of Fig. 3.

Fig. 5 is a similar section taken on line E—F of Figure 3.

Fig. 6 is a top plan view of the structure shown in Fig. 3.

It will be noted that the sections shown in Figs. 4 and 5 are also taken respectively, along the lines C—D and E—F of Fig. 6.

Fig. 7 is a side view of the bar after its guiding surfaces have been shaped and the part connecting the links has been cut away.

Fig. 8 is a section taken on the line G—H of Fig. 7 and illustrating diagrammatically the manner in which the connecting piece between the links is removed.

Fig. 9 is a section taken on line J—K of Fig. 7.

Fig. 10 is a top plan view of the construction shown in Fig. 7.

It will be noted that the sections shown in Figs. 8 and 9 are also taken respectively on the lines G—H and J—K of Fig. 10.

Fig. 11 is a side view of the complete jar.

Fig. 12 is a section taken on line L—M of Fig. 11.

Fig. 13 is a top plan view of the construction shown in Fig. 11.

It will be observed that the section shown in Fig. 12 is also taken along the line L—M of Fig. 13.

From Figs. 1 and 2 it will be seen that the bar is first given a cruciform cross section for a suitable portion of its length by forging, milling, planing or otherwise.

Figs. 3 to 6 show that in the cruciform portion there are provided two similar U-shaped or V-shaped slots 14 and 15 which slightly overlap one another and which are in planes at right angles to one another. In this way there are formed two links or loops which are connected by the block 16.

The major portion of the block 16 can be removed by means of the drill represented in the positions 17 and 17' in Fig. 8 so that the links are no longer rigidly connected. The rest of the block 16 can be removed by filing, trimming or otherwise. It is evident that the block 16 need not be drilled out but may be otherwise removed. It is an important point, however, that the openings presented by the slots 14 and 15 be relatively wide to render the block 16 readily accessible.

The ends of the links are tapered and rounded at 18 and contracted at 19 preferably before the piece 16 is removed, while the inner sides 20 of the limbs of the links are rounded, thus shaping the opposite sides of said pointed members 18 and the opposite walls 20 of said slots.

Thereupon the links are pressed together or hammered transversely. In this operation the contraction 19 is upset so that it forms an approximately close fit on the rounded faces 20 of the other link, which faces have been brought closer to the opposite contracted portion in consequence of the compression or hammering. In this way there is produced the jar according to Figs. 11, 12 and 13. The squares therein shown for engagement by spanners and the screw-threads which are not shown are immaterial from the point of view of the invention.

As the parts can be worked with the desired precision and the homogeneity of the material is not prejudiced by welding, the compression of the jar results in perfectly regular alteration of form so that the tool finally produced presents a perfectly finished internal guide. The strength of the jar relatively to its diameter is a maximum.

Claims:

1. A method of producing a jar for drills consisting in forming two overlapping substantially U-shaped slots in planes at right angles to each other in a bar of cruciform section to form links having oppositely directed pointed members, removing the part connecting the links so formed, shaping the opposite walls of said slots and the opposite sides of said pointed members, and compressing the links transversely in such manner as to cause the shaped walls of said slots to slidably engage the shaped sides of said pointed members throughout substantially the entire length of said pointed members.

2. A method of producing a drill jar consisting in cutting two overlapping substantially U-shaped slots in planes at right angles to each other in a bar of cruciform section to form links having oppositely directed pointed members, removing the portion of said bar which connects the links so formed, shaping the opposite walls of said slots and the opposite sides of said pointed members to provide complementary curved surfaces, and compressing the links transversely in such manner as to cause the shaped walls of said slots to slidably engage the shaped sides of said pointed members throughout substantially the entire length of said pointed members.

3. A drill jar comprising a plurality of links having slots and oppositely directed pointed members, each of said links consisting of an integral weldless piece of metal, the opposite walls of said slots being shaped, and the opposite side walls of said links being complementary-shaped and slidably engaging the shaped surfaces of the side walls of the slots.

4. A method of forming jars from a single bar of metal which consists in displacing the metal of the bar on each side of an intermediate portion of the bar to form the oppositely projecting reins and striking heads, severing the intermediate portion of the bar to disconnect the interlocked members so formed and shaping the reins of each interlocked member so that each pair of reins co-operates with the other in guiding the relative motion of the interlocked members.

5. A method of forming jars from a single bar of metal, which consists in displacing the metal longitudinally and in both directions from a point intermediate the ends of the bar to form the oppositely extending reins and striking heads of the interlinked members, so severing the intermediate portion of the bar that the members so formed are retained in interlocking engagement and then in so shaping the members that each forms a guide for the other during relative motion of the members.

6. A method of manufacturing jars from a single piece of metal which consists in displacing metal to form the interlocking members of the jars in the interlocked position and connected together, then in severing the metal connecting the members, and finally shaping the members so that the reins of each member form guides for the other member.

In testimony whereof I affix my signature.

WILLEM KÖLER, Junior.